United States Patent [19]

Johansson

[11] 4,123,030
[45] Oct. 31, 1978

[54] REAR VIEW MIRROR

[76] Inventor: Nils G. Johansson, Östrandsvägen 30, Timrå, Sweden, 86100

[21] Appl. No.: 806,940

[22] Filed: Jun. 15, 1977

[30] Foreign Application Priority Data

Jun. 16, 1976 [SE] Sweden .............................. 7608123

[51] Int. Cl.² .............................................. A47G 1/24
[52] U.S. Cl. ................................ 248/478; 248/475 B; 248/539
[58] Field of Search ............... 248/478, 475 R, 475 A, 248/475 B, 208, 476, 477, 479, 484, 466, 214, 215, 538, 539; 108/44, 46, 47; 211/96

[56] References Cited

U.S. PATENT DOCUMENTS

| 787,098 | 4/1905 | Hellman | 248/539 |
| 2,411,421 | 11/1946 | Golden | 248/475 R |
| 2,419,306 | 4/1947 | Zeiler | 248/475 R |
| 2,812,917 | 11/1957 | Crosby | 248/484 |
| 3,036,545 | 5/1962 | Legg | 248/539 |
| 3,363,600 | 1/1968 | Gary | 248/539 |

FOREIGN PATENT DOCUMENTS 961,623  6/1964  United Kingdom ................. 248/475 B Primary Examiner—Robert A. Hafer
Attorney, Agent, or Firm—Burns, Doane, Swecker & Mathis

[57] ABSTRACT

A rear-view-mirror arrangement is provided that can be detactally mounted to the window of a vehicle especially towing vehicle. The arrangement comprises an extensible arm, first means at one end of said arm for receiving a mirror, and second means at the other end of said arm for removably attaching the arm to said window. Said second means comprises a member by means of which the mirror can be placed in full view of the driver of the vehicle.

2 Claims, 2 Drawing Figures

REAR VIEW MIRROR

FIELD OF THE PRESENT INVENTION

The present invention relates to a rear-view-mirror arrangement and particularly, but not exclusively, to a rear-view-mirror arrangement that can be detachably mounted to one edge of a side-window of a vehicle, especially motor-driven towing vehicle. This rear-view-mirror arrangement comprises an arm, on one end of which there is mounted a holder for a rear mirror and on the other end of which there is mounted an attachment by which the arm with the rear-mirror thereon can be removably attached to the side window of the vehicle.

BACKGROUND OF THE PRESENT INVENTION

It is a law that all motor-driven vehicles must be provided with a rear-view-mirror, so that the driver of said vehicle can observe vehicles which are moving behind the vehicle which he is driving.

Motor-driven vehicles, however, are permitted to tow a trailer, for example a caravan, and since these trailers may have a width which exceeds the width of the towing vehicle, it is impossible, with conventional rear-view-mirrors, to observe following traffic. In order to eliminate this disadvantage it is stipulated that a motor-driven vehicle towing a trailer, whose width exceeds the width of the motor-driven vehicle, shall have a specially designed rear-view-mirror arrangement, which enables the driver to observe the following traffic,. This special rear-view-mirror arrangement necessarily extending a considerable distance from the side of the motor-driven vehicle.

OBJECTS OF THE PRESENT INVENTION

An object of the present invention is to provide a rear-view-mirror arrangement which is particularly suited for this latter purpose.

Such rear-view-mirror arrangements, which are normally only in temporary use that is when towing a vehicle whose width exceeds the width of the towing vehicle, shall be of simple construction and shall be capable of being readily attached to the vehicle in a manner which enables them to be easily removed therefrom. By easily removed from the vehicle is meant in the present context that the rear-view-mirror arrangement as a whole shall be capable of being dismantled from the vehicle by simple manual manipulation. This means that the actual rear-view-mirror arrangement, comprising the arm for holding the mirror and the means for attaching it to the vehicle, shall be capable of being removed in one single working operation, without any damage or marking the vehicle. It is also important that the arm is extensible, so that the rear-view-mirror can be arranged in a position relative to the side of the vehicle such that the driver of said vehicle is able to see the following traffic.

Moreover, it is important that the means by which the rear-view-mirror arrangement is attached secured to the vehicle does not obstruct the driver's vision into the mirror.

The present invention provides a rear-view-mirror arrangement constructed to fulfil the aforementioned desiderata.

The characterizing features of a rear-mirror arrangement according to the invention are disclosed in the appended claims.

BRIEF DESCRIPTION OF THE DRAWING

So that the invention will be more readily understood and further features thereof made apparent, an exemplary embodiment of the invention will now be described with reference to the accompanying drawing in which.

DESCRIPTION OF A PREFERRED EMBODIMENT

Figure 1:
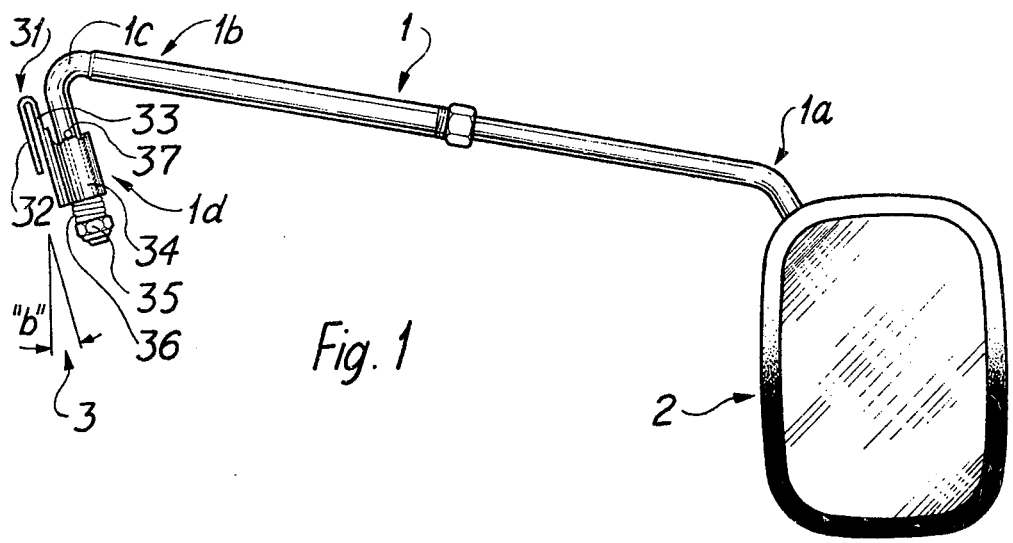
FIG. 1 is a perspective view of a rear-view-mirror arrangement according to the invention.

Thus FIG. 1 is a perspective view of a rear-view-mirror arrangement which is particularly intended to be removable attached to one edge of a side window of a motor-driven vehicle. The rear-view-mirror arrangement comprises an arm 1, on one end 1a of which there is mounted a holding device (obscured in FIG. 1) for a mirror 2, and to the other end 1b of which there is mounted an attachment device 3. The end 1b of the arm on which the device 3 is mounted has a curved portion 1c the angle of curvature 2 is less than 90°.

The attachment device 3 comprises a U-shaped member 31 having limbs 32 and 33, the distance between which being equal to or slightly more than the thickness of the window glass. The outwardly facing limb, here 33, carries a sleeve 34 arranged to co-act with a curved portion 1d of the arm 1. The curved portion 1d of said arm is pivotally arranged in the sleeve 34.

With regard to the curvature 1c of the arm 1, it shall be observed that this curvature shall be such that the area of vision 21 of the driver 22 onto the mirror 2 shall not be obstructed by the attachment device 3. In order that this shall be possible, it has been established by practical tests that the curvature "a" should be less than 80° but greater than 45°. Conveniently this curvature shall lie within an angular range of 65°–55°, and shall preferably be approximatley 57°. This angle is also dependent upon the angle "b" at which the window is inclined to the vertical plane.

The curved portion 1d of the arm is provided at its free end with a threaded portion arranged to co-act with a correspondingly threaded nut 35. A spring 36 is arranged between the nut 35 and the sleeve 34.

The upper portion of the sleeve 34 is provided with a groove in which a pin 37 extending through the arm 1d is arranged to coact, thereby to allow the mirror to be set to anyone of a number of predetermined positions. This arrangement is such as to ensure that, when the arm is subjected to a pressure exceeding a pre-determined value, the pin 37 will cease to co-act with the groove so that the arm 1 is able to rotate. In this context, it is essential that this pre-determined value is such that the attachement device 3 does not break the window on which it is mounted.

Figure 2:
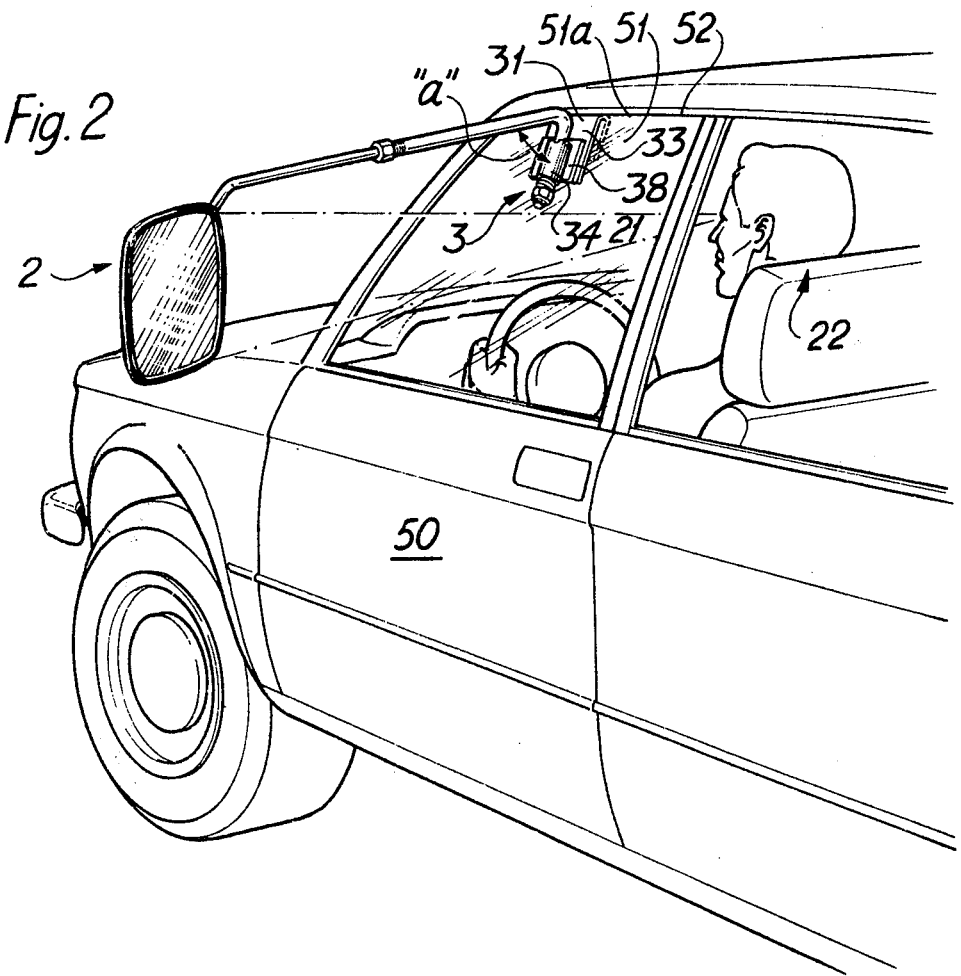
FIG. 2 shows a rear-view-mirror arrangement according to the invention mounted to the edge of a side window of a motor-driven vehicle.

FIG. 2 illustrates how a rear-view-mirror arrangement is mounted on the side-window of a motor-driven vehicle. The vehicle is identified by the reference numeral 50. The window 51 can be raised and lowered by means of devices not shown in the drawing and when such a rear-mirror arrangement is to be mounted on the window, said window is lowered so that the upper edge 51a thereof is located a certain distance form a body member 52 of the vehicle. This enables the limbs 32 and 33 to be positioned on respective sides of the window 51, whereafter the window 51 is raised to its uppermost position and the portion 31 is held by the window 51.

In the illustrated embodiment of FIG. 1, the limbs 32 and 33 are mutually parallel. There is nothing to prevent however, the free end of limb 32 from being closer to the limb 33, thereby to provide a compressive force between the limbs. With this latter embodiment, there is nothing to prevent the smallest distance between the limbs from being less than the thickness of the vehicle window on which the rear-mirror arrangement is mounted.

The invention is not restricted to the aforedescribed embodiment but can be modfied within the scope of the invention. For example, the sleeve 34 may be conveniently welded to a plate 38 attached to the limb 33. There is nothing to prevent however, the sleeve 34 from being directly connected to the limb 33.

The curvature 1c of the rear-mirror arrangement according to the invention is partly dependent upon the length of the arm 1 but is predominantly dependent upon the fact that, in the majority of motor-driven vehicles, the window 51 has a specific inclination "b" to the vertical plane. With regard to the field of vision 21, it should be ensured that the upper edge of the mirror 2 located in said field passes immediately beneath the nut 35, as also illustrated in FIG. 2.

What is claimed is:

1. A rear-view-mirror arrangement which can be detachably mounted to the window of a vehicle, said arrangement comprising an arm, on one end of which there is arranged a device for holding a mirror and on the other end of which there is arranged means for detachably mounting said arrangement to said window including a U-shaped member having limbs, whose distance apart is equal to or slightly greater than the thickness of said window, the outwardly facing limb of said attachment device carrying a sleeve arranged to co-act with said arm so as to permit rotation of said arm in said sleeve, wherein
    (a) said arm at said attachment device is provided with a curved portion whose angle of curvature is less than 80° and more than 45° so that it is locatable at the edge of or externally of the area of vision of the driver of said vehicle to said mirror;
    (b) said other end of said arm having a threaded portion, with which a corresponding nut cooperates;
    (c) a spring loosely surrounding said other end of said arm and biasing the lower surface of said sleeve and the upper surface of said nut apart; and,
    (d) a pin affixed to said other end of said arm a predetermined axial distance from said threaded portion said pin bearing against the upper surface of said sleeve and compressing said sleeve against said spring, the upper surface of said sleeve having grooves which cooperate with said pin to thereby permit said mirror to be adjusted to anyone of a number of predetermined positions, and in that the arrangement of said arm is such that when said arm is subjected to a pressure exceeding a pre-determined value said pin will no longer co-act with said groove thereby enabling the arm to rotate relative to said sleeve.

2. A rear-view-mirror arrangement according to claim 1, characterized in, that said angle of curvature lies within 65°–50°, preferably approximately 57°.

* * * * *